United States Patent
Johnson et al.

(10) Patent No.: US 11,361,312 B2
(45) Date of Patent: Jun. 14, 2022

(54) SYSTEM AND METHODS FOR POINT TO POINT ENCRYPTION AND TOKENIZATION USING A MOBILE DEVICE

(71) Applicant: Walmart Apollo, LLC, Bentonville, AR (US)

(72) Inventors: Aaron Marcus Johnson, Rogers, AR (US); Christopher John Gerber, Bella Vista, AR (US); Gerald Duane Corson, III, Rogers, AR (US); Charles Alan Watts, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 761 days.

(21) Appl. No.: 15/710,250

(22) Filed: Sep. 20, 2017

(65) Prior Publication Data

US 2018/0082289 A1    Mar. 22, 2018

Related U.S. Application Data

(60) Provisional application No. 62/397,514, filed on Sep. 21, 2016.

(51) Int. Cl.
G06Q 20/00   (2012.01)
G06Q 20/38   (2012.01)
(Continued)

(52) U.S. Cl.
CPC ..... *G06Q 20/3829* (2013.01); *G06F 21/6245* (2013.01); *G06Q 20/3223* (2013.01); *G06Q 20/3226* (2013.01); *G06Q 20/401* (2013.01); *H04L 9/0861* (2013.01); *H04L 9/30* (2013.01); *H04L 63/0428* (2013.01); *H04L 63/0442* (2013.01); *H04W 12/02* (2013.01); *H04W 12/033* (2021.01); *G06Q 20/3278* (2013.01); *G06Q 20/34* (2013.01); *G06Q 2220/00* (2013.01); *H04L 2209/56* (2013.01); *H04L 2463/102* (2013.01); *H04W 4/80* (2018.02); *H04W 88/02* (2013.01)

(58) Field of Classification Search
CPC ........... G06Q 20/3829; G06Q 20/3223; G06Q 20/3226; G06Q 20/401; G06Q 20/3278; G06Q 20/34; G06Q 2220/00; H04W 12/033; H04W 12/02; H04W 88/02; H04W 4/80; H04L 9/0861; H04L 9/30; H04L 63/0428; H04L 63/0442; H04L 2463/102; H04L 2209/56; G06F 21/6245
See application file for complete search history.

(56) References Cited

U.S. PATENT DOCUMENTS 8,739,262 B2   5/2014 Harper et al.
8,763,142 B2   6/2014 McGuire et al.
(Continued)

OTHER PUBLICATIONS

Axon, et al., Understanding and Selecting a Tokenization Solution, Securosis, Jun. 30, 2010.
(Continued)

*Primary Examiner* — Dante Ravetti
(74) *Attorney, Agent, or Firm* — Fitch, Even, Tabin & Flannery LLP

(57) ABSTRACT

Mechanisms for providing point to point encryption and tokenization enabling decryption, tokenization and storage of sensitive encrypted data on one system are discussed.

19 Claims, 8 Drawing Sheets

(51) Int. Cl.
| | |
|---|---|
| *H04W 12/02* | (2009.01) |
| *H04L 9/08* | (2006.01) |
| *H04W 12/033* | (2021.01) |
| *G06F 21/62* | (2013.01) |
| *G06Q 20/32* | (2012.01) |
| *G06Q 20/40* | (2012.01) |
| *H04L 9/30* | (2006.01) |
| *H04L 9/40* | (2022.01) |
| *H04W 88/02* | (2009.01) |
| *H04W 4/80* | (2018.01) |
| *G06Q 20/34* | (2012.01) |

(56) References Cited

U.S. PATENT DOCUMENTS

| | | | |
|---|---|---|---|
| 8,892,868 B1 | 11/2014 | Jenks et al. | |
| 9,652,769 B1 | 5/2017 | Golin | |
| 2007/0168228 A1 | 7/2007 | Lawless | |
| 2011/0258123 A1 | 10/2011 | Dawkins et al. | |
| 2011/0296173 A1 | 12/2011 | Agrawal et al. | |
| 2012/0005038 A1* | 1/2012 | Soman | G06Q 30/0613 705/26.41 |
| 2012/0041881 A1* | 2/2012 | Basu | G06Q 20/12 705/67 |
| 2012/0310826 A1* | 12/2012 | Chatterjee | G06Q 20/326 705/41 |
| 2013/0198080 A1* | 8/2013 | Anderson | G06Q 20/38215 705/44 |
| 2013/0212666 A1 | 8/2013 | Mattsson | |
| 2014/0040148 A1 | 2/2014 | Ozvat et al. | |
| 2014/0108172 A1 | 4/2014 | Weber et al. | |
| 2014/0208408 A1* | 7/2014 | Bilgen | H04L 63/0815 726/8 |
| 2014/0366151 A1 | 12/2014 | McGuire et al. | |
| 2015/0112870 A1* | 4/2015 | Nagasundaram | G06Q 20/3821 705/67 |
| 2015/0121501 A1* | 4/2015 | Khalid | H04L 63/0853 726/8 |
| 2015/0161596 A1 | 6/2015 | McCarthy | |
| 2015/0379505 A1 | 12/2015 | Slater | |
| 2016/0036854 A1 | 2/2016 | Himawan | |
| 2016/0132878 A1 | 5/2016 | O'Regan | |
| 2016/0191236 A1 | 6/2016 | Smirnoff et al. | |
| 2016/0218875 A1* | 7/2016 | Le Saint | H04L 63/045 |
| 2016/0254915 A1 | 9/2016 | Jenkinson | |
| 2016/0254918 A1 | 9/2016 | Liu | |
| 2016/0335656 A1 | 11/2016 | Venugopalan | |
| 2017/0200150 A1 | 7/2017 | Cohn | |

OTHER PUBLICATIONS

Ecentric Payment Systems, The Roadt to Point-to-Point Encryption and Tokenisation, copyright 2013.
First Data, Data Encryption and Tokenization: An Innovative On-Two Punch to Increase Data Security and Reduce the Challenges of PCI DSS Compliance, Sep. 2009.
Thales & Security, Tokenization Solutions Protect Data & Contain Costs, https://www.thalesesecurity.com/solutions/bytechnologyfocus/tokenization, last viewed Oct. 5, 2016.
First Data, TransArmor Solution: Protect valuable payment card data from the moment of swipe throughout the transaction with the First Data TransArmor solution, 2012.
International Search Report and Written Opinion from related International Patent Application No. PCT/US2017/052454 dated Nov. 17, 2017.
International Search Report and Written Opinion from related International Patent Application No. PCT/US2017/052468 dated Nov. 17, 2017.
International Search Report and Written Opinion from related International Patent Application No. PCT/US2017/052482 dated Nov. 27, 2017.
U.S. Appl. No. 15/710,107; Office Action dated Mar. 1, 2021; (pp. 1-20).
U.S. Appl. No. 15/710,107; Notice of Allowance dated Jul. 12, 2021; (pp. 1-14).
Wahjuni et al., "Android-based token authentication for securing the online transaction system," 2016 International Conference on Information and Communication Technology Convergence (ICTC) Year: 2016 | Conference Paper | Publisher: IEEE.
U.S. Appl. No. 15/710,107; Notice of Allowance dated Jul. 23, 2021; (pp. 1-10).
Jayasinghe et al., "Extending EMV Tokenised Payments to Offline-Environments," 2016 IEEE Trustcom/BigDataSE/ISPA Year: 2016 | Conference Paper | Publisher: IEEE.
U.S. Appl. No. 15/710,107; Notice of Allowance dated Jul. 29, 2021; (pp. 1-1).

* cited by examiner

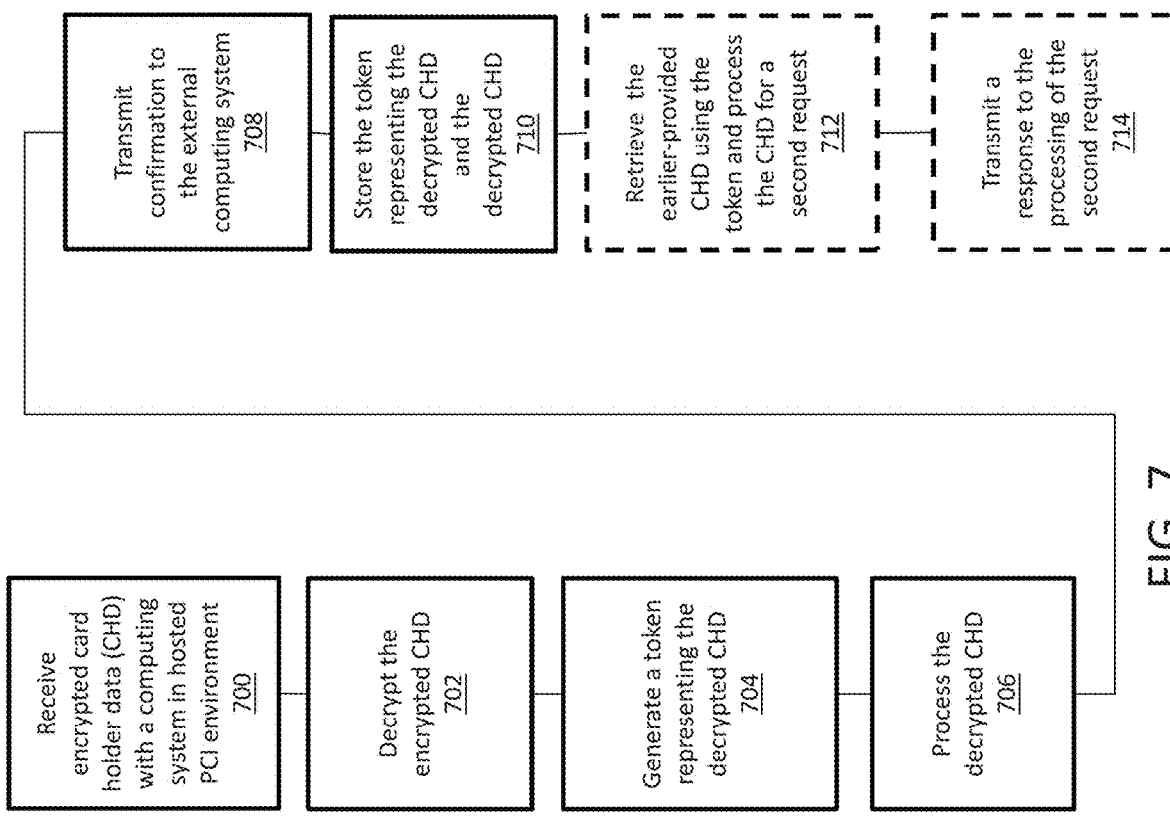

SYSTEM AND METHODS FOR POINT TO POINT ENCRYPTION AND TOKENIZATION USING A MOBILE DEVICE

CROSS-REFERENCE TO RELATED PATENT APPLICATIONS

This application claims priority to U.S. Provisional Application No. 62/397,514 filed on Sept. 21, 2016, the content of which is hereby incorporated by reference in its entirety.

BACKGROUND

Sensitive data may be entrusted to a computing system by a user. The sensitive data may be transferred between different computing systems.

BRIEF SUMMARY

In one embodiment, a point to point encryption and tokenization system using a mobile device includes an application configured to execute on a user's mobile device and to encrypt data associated with a user. The system also includes a first computing system in communication with the mobile device and a database in communication with the first computing system. The first computing system is configured to receive encrypted data from the mobile device and to transmit the encrypted data to a second computing system hosting a Payment Card Industry Data Security Standard (PCI DSS)-compliant environment as part of a request to process the encrypted data. The first computing system is further configured to receive a response from the second computing system indicating that the processing has occurred accompanied by a token representing the data, to complete a transaction based on the response, and to transmit the token representing the data to a database for storage.

In another embodiment, a method for point to point encryption and tokenization using a mobile device includes receiving encrypted data associated with a user from an application executing on the mobile device at a first computing system, transmitting the encrypted data as part of a request to process the encrypted data from the first computing system to a second computing system hosting a Payment Card Industry Data Security Standard (PCI DSS)-compliant environment. The method further includes receiving a response to the request from the second computing system at the first computing system indicating that the processing has occurred. The response is accompanied by a token representing the data. The method further includes completing, via the first computing system, a transaction based on the response, and transmitting the token representing the data from the first computing system to a database for storage.

BRIEF DESCRIPTION OF DRAWINGS

The accompanying figures, which are incorporated in and constitute a part of this specification, illustrate one or more embodiments of the present invention and, together with the description, help to explain the present invention. The embodiments are illustrated by way of example and should not be construed to limit the present invention. In the figures:

FIG. 7 is a flowchart illustrating an exemplary process performed in point to point encryption and tokenization in a hosted machine payment card industry (PCI) environment implementing a data security standard according to an exemplary embodiment.

DETAILED DESCRIPTION

Embodiments as described herein provide enhanced security to the processing of CHD and other sensitive data in a large-scale payment card data environment by limiting where the data can be accessed. Multiple cryptographic techniques are used to provide data security. Described in detail herein are point to point encryption and tokenization enabling decryption, tokenization and storage of sensitive encrypted data within a large-scale payment card environment. In one embodiment, sensitive data can be received by a pin entry device (PED). The PED can transmit the encrypted sensitive data to a first computing system for processing the encrypted sensitive data. The first computing system can transmit the encrypted sensitive data to a second computing system for processing the encrypted sensitive data. The second computing system can decrypt the encrypted sensitive data, generate a token representing the decrypted sensitive data and process the decrypted sensitive data. The second computing system can transmit a confirmation of the processing and a copy of the token to the first computing system. The copy of the token can be stored in a database in communication with the first computing system. The second computing system can store the token representing the sensitive decrypted data along with the decrypted data in a database. Subsequently the second computing system can also receive the token from the first computing system as part of a request for processing the decrypted sensitive data from the first computing system. The second computing system can retrieve the decrypted sensitive data associated with the received token and process the decrypted sensitive data in response to the request.

Figure 1A:
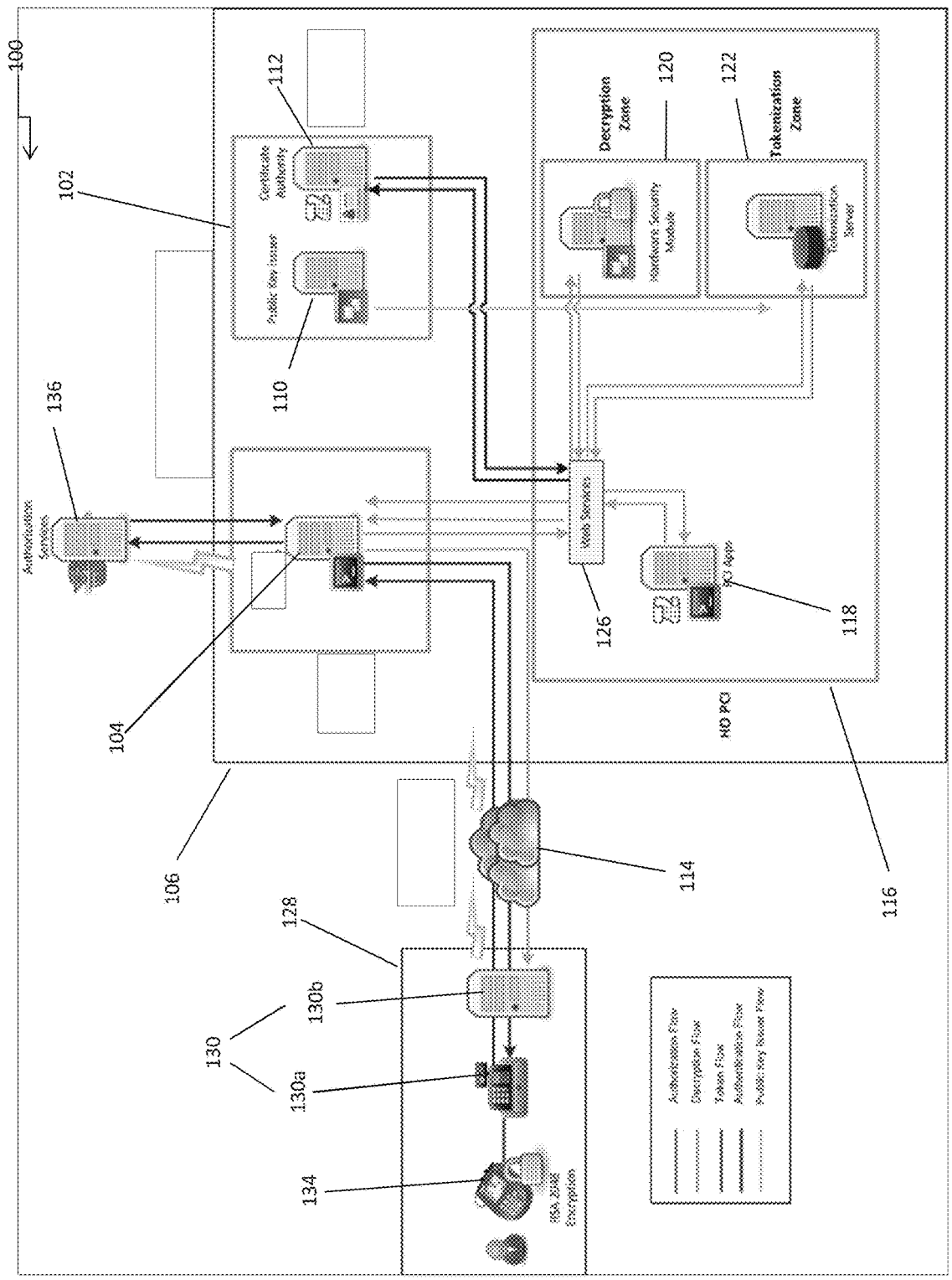
FIG. 1A is a block diagram of a point to point encryption and tokenization system in accordance with an exemplary embodiment.

FIG. 1A is a block diagram of a point to point encryption and tokenization system in accordance with an exemplary embodiment. The point to point encryption and tokenization system 100 can include a PED 134, a first computing system 130, a second computing system 106 and an authorization services system 136. In one embodiment the first computing system 130 can be located in a retail facility 128 and may include a Point-of-Sale (POS) register 130a in communication with a POS controller 130b and the PED 134 can be a configured to receive Card Holder Data (CHD) in response to complete a purchase of products. In alternative embodiments, the first computing system 130 and the PED 134 can be disposed in different locations. The first computing system 130 can be connected to the second computing system 106 through a secure network 114. The second computing system 106 can include processing modules connected to each other. In one embodiment, some of the modules may be connected in a Payment Card Industry (PCI) zone 116 configured to process data in compliance with the PCI Data Security Standard (DSS) in a secure environment. The connected processing modules can include a decryption module 120, a tokenization module 122, a web-services module 126 and applications 118. As a non-limiting example, the applications 118 may be one or more of finance, treasury or reconciliation applications running within a PCI zone. The applications 118 and web services module can be configured to request execution of the decryption module 120 and the tokenization module 122. The second computing system 106 can further include an authorization module 104 and a key management module 102. The key management module 102 can include a certificate authority server 112 and a public key server 110. The decryption module 120, tokenization module 112, authorization module, and key management module 102 each can be segmented into different zones within the second computing system 106 to ensure that each module is able to communicate with one another only when necessary and authorized. In this configuration the segmented zones cannot access data from another segmented zone unless permission is granted. Each of the segmented zones provide a layer of security. For example, the layer of security can be a combination of one or more of: access control lists which limit which IP addresses can communicate with one another via TCP/UDP ports, firewalls which can provide similar functionality to the access control lists but also may perform stateful packet and application inspection and intrusion prevention systems which monitor network behavior for malicious activity and blocks based on policies. The security layers ensure the data is protected when being transferred from one segmented zone to the other within the second computing system 106. It will be appreciated that additional layers of security and/or techniques may also be deployed by the second computing system without departing from the scope of the present invention.

In one embodiment, the PED 134 can receive and encrypt sensitive data. For example, the PED 134 may receive and encrypt credit card data. In one embodiment the PED 134 can use asymmetric encryption to encrypt the sensitive data. Asymmetric encryption is a form of encryption in which keys are generated in pairs. The sensitive data can be encrypted using a first key and decrypted using a different second key. In most cases of asymmetric encryption one key is a public key that may be widely distributed and the second key is a private key that is kept secret. In another embodiment, the PED 134 may use symmetric encryption to encrypt and decrypt the sensitive data where copies of the same key are used for encryption and decryption (and public access to both keys is restricted). The encrypted sensitive data can be transmitted to the first computing system 130. The first computing system 130 can transmit the encrypted sensitive data 130 for processing to the second computing system 106. The first computing system 130 can also send a security certificate with the encrypted sensitive data to the second computing system. The authorization module 104 can receive the encrypted sensitive data and the security certificate and transmit the encrypted sensitive data and the security certificate to the web-services module 126 for further handling. The web-services module 126 can attempt authentication of the encrypted sensitive data by transmitting the security certificate to the certificate authority server 112. The certificate authority server 112 can authenticate the security certificate and transmit a confirmation of authentication to the web-services module 126. The web-services module 126 can then route the encrypted sensitive data to the decryption module 120.

In one embodiment, the decryption module 120 can be a Hardware Security Module (HSM). A HSM is a physical computing device that safeguards and manages digital keys for strong authentication and provides crypto-processing. The decryption module 120 can decrypt the sensitive data. The decryption module 120 can retrieve a public key to decrypt the encrypted sensitive data from the public key server 110. The decryption module 120 transmits the decrypted sensitive data to the web-services module 126. The web-services module 126 can route the decrypted sensitive data to the tokenization module 122. The tokenization module 122 can generate a token using tokenization. Tokenization is the process of substituting sensitive data with a non-sensitive equivalent. For example, the token can be an alphanumeric string that is different from the decrypted sensitive data and represent the decrypted sensitive data. The tokenization module 122 can store the token and the decrypted sensitive data in a token vault. The tokenization module 122 can transmit the token to the web-service module 122 along with the decrypted sensitive data. The web-services module 122 can transmit the decrypted sensitive data and the token to the authorization module 104 for further processing. The authorization module 136 can transmit the decrypted sensitive data to authorization services 136 to complete an authorization process using the decrypted data. In one embodiment, the authorization services 136 can be located outside of the second computing system and, for example, if run by a third party, the decrypted data can re-encrypted for transit and then decrypted again by the authorization services so that authorization can be performed. The authorization services 136 can process the sensitive data and transmit a confirmation of processing to the authorization module 104. The authorization module 104 can transmit a receipt of completion of the processing along with the token representing the decrypted sensitive data to the first computing system 130. The first computing system 130 can store the token in a transaction log in a database instead of storing the sensitive data itself.

The first computing system 130 can receive a request to process the same encrypted sensitive data a subsequent time. For example, this could occur when the first computing system 130 receives a request from a user to perform a transaction using saved card data. The first computing system 130 can transmit the token associated with the encrypted sensitive data from the transaction log to the second computing system 106 as part of a request. The authorization module 104 can receive the token and transmit the token to the web-services module 126. The web-services module 126 can retrieve the decrypted sensitive data associated with the token. The web-services module 126 can transmit the decrypted sensitive data associated to the authorization module 104 and the authorization module 104 can transmit the sensitive decrypted sensitive data to the authorization services 136. The authorization services 136 can authorize the decrypted sensitive data and transmit a confirmation to the authorization module 104. The authorization module 104 can transmit a receipt confirming authorization processing along with the token to the first computing system 130. In this manner sensitive data can be referenced at the first computing system without actually being present thus enhancing security.

Figure 1B:
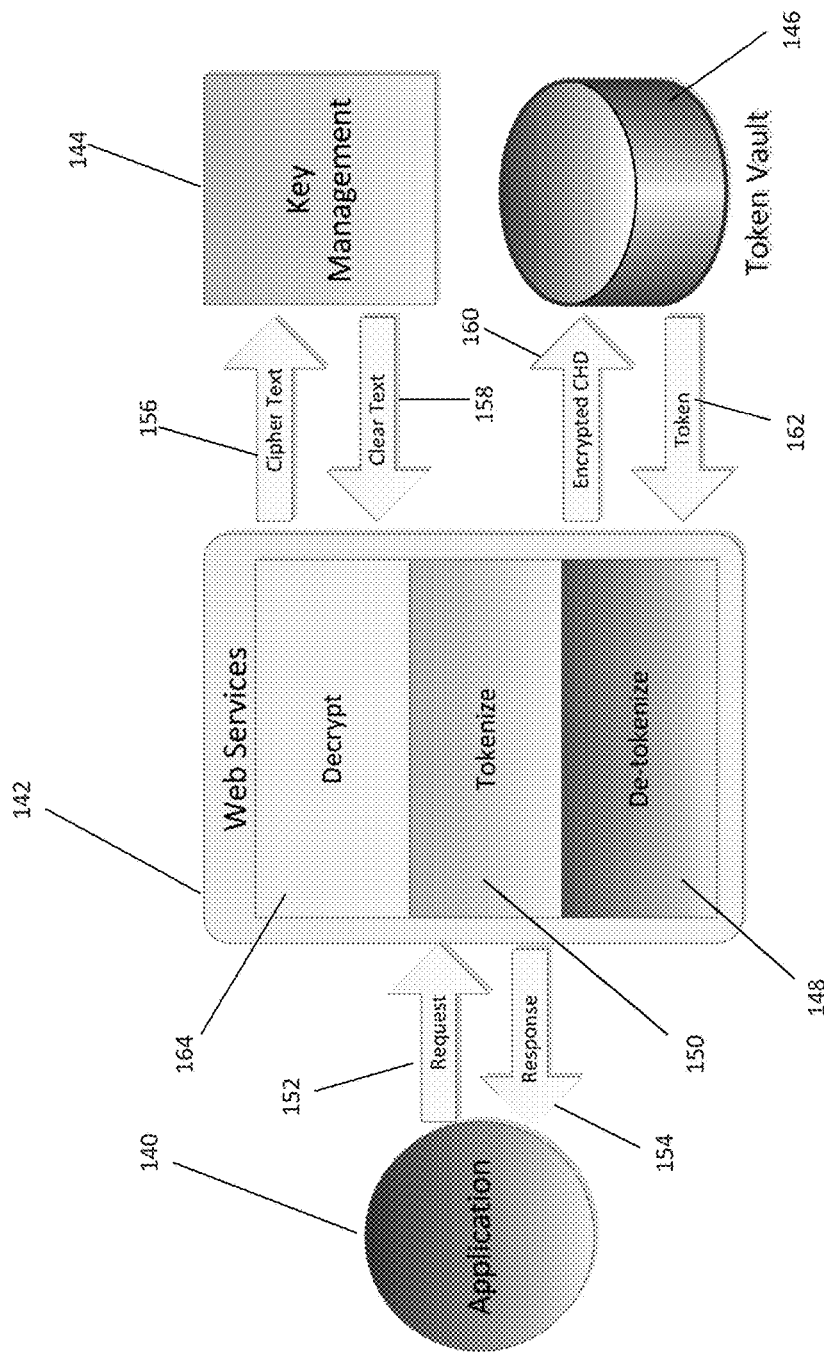
FIG. 1B is a block diagram of data flow in a point to point encryption and tokenization system point in accordance with an exemplary embodiment.

FIG. 1B is a block diagram of data flow in a point to point encryption and tokenization system point in accordance with an exemplary embodiment. web-services module 142 can be implemented as middleware within the second computing system. In one embodiment, the web services module 142 may provide some or all of the services using a representational state transfer (REST) architecture (i.e. the services may be RESTful services) The web-services module 142 can receive a request 152 from an application 140 to process sensitive data. In the event the request includes encrypted sensitive data, the web services module can utilize the decryption module 164 to decrypt the encrypted sensitive data. The decryption module 164 can transmit the encrypted sensitive data to the key management module 144 as cipher text 156 and the key management module 144, may decrypt the encrypted sensitive data and transmit the decrypted sensitive data as clear text 158 to the web-services module 142. The web-services module 142 can transmit the decrypted sensitive data to the tokenization module 150 so that the tokenization module 150 can generate a token to represent the decrypted sensitive data. The tokenization module 150 can transmit the decrypted sensitive data 160 and token to a token vault 146 for storage. The web-services module 142 can process the request 152 and transmit a response 154 back to the application 140. For example, the response may indicate that a transaction has been authorized.

In the event the web-services module 142 receives a token in the request to process sensitive data the web-services module 142 can transmit the token to the de-tokenization module 148. The detokenization module 148 can access the decrypted sensitive data in the token vault 146 using the token to find the associated data. The web-services module 142 can process the decrypted sensitive data and transmit a response 154 from processing the decrypted sensitive data back to the application 140.

Figure 2:
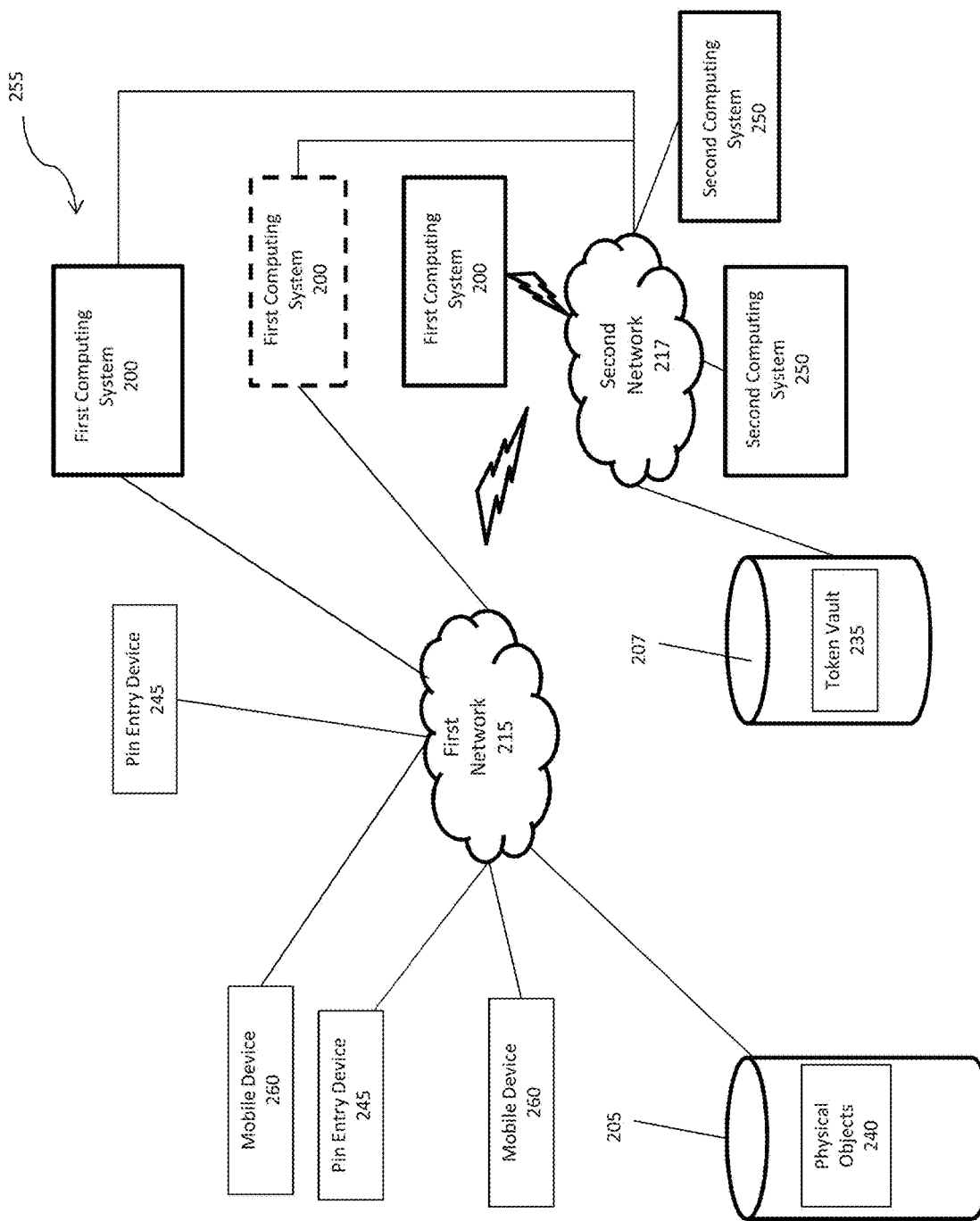
FIG. 2 is a network diagram of the point to point encryption and tokenization system according to an exemplary embodiment.

FIG. 2 illustrates an exemplary point to point encryption and tokenization system 255. The point encryption and tokenization system 255 can include a first database 205, a second database 207, one or more of first computing systems 200, one or more of the second computing systems 250, one or more mobile devices 260 and one or more pin entry devices 245. In one exemplary embodiment, the first computing system 200 can be in communication with the first database(s) 205, the mobile devices 260, and the pin entry devices 245, via a first communications network 215. The second computing system 250 can be in communication with the second database(s) 207, and the first computing system 200, via second communication network 217.

In an example embodiment, one or more portions of the first and second communications network 215, 217 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The first computing system 200 may include one or more computers or processors configured to communicate with first database(s) 205, the mobile devices 260, and the pin entry devices 245, via the first network 215. The first computing system 200 may host one or more applications configured to interact with one or more components first computing system 200 and/or facilitates access to the content of the first databases 205. The second computing system 250 includes one or more computers or processors configured to communicate with the second database(s) 207, and the first computing system 200, via second communication network 217. The second computing system 250 may host one or more applications configured to interact with one or more components of the first computing system 200 and/or facilitates access to the content of the second databases 207. The first databases 205 may store information/data, as described herein. For example, the first databases 205 can include a physical objects database 240. The physical objects database 240 can store information associated with physical objects disposed at various facilities. The first databases 205 can be located at one or more geographically distributed locations from each other or from the first computing system 200. Alternatively, the first databases 205 can be included within in a computer or processing device of the first computing system 200. The second databases 207 may store information/data, as described herein. For example, the second databases 207 can include a token vault. The token vault 235 can store sensitive decrypted data and a token representing the sensitive decrypted data. The second databases 207 can be located at one or more geographically distributed locations from each other or from the second computing system 250. Alternatively, the second databases 207 can be included within a computer or processing device of the second computing system 250. As a non-limiting example, the point encryption and tokenization system 255 can be implemented in a physical retail store. In another embodiment, a mobile device 260 can receive CHD for completing a purchase on an online retail store using a mobile application. The mobile device 260 can encrypt the CHD using asymmetric encryption and transmit the encrypted CHD to a first computing system 200. In some embodiments, the mobile device 260 and the first computing system 200 can be in different geographic locations. In other embodiments, the mobile device 260 and the first computing system 200 can be in the same geographic location.

Once the encrypted CHD is received, the first computing system 200 can transmit the encrypted CHD for processing a payment to the second computing system 250, via the second network 217. The first computing system 200 can also send a security certificate along with the encrypted CHD. An authorization module (e.g. authorization module 104 as shown in FIG. 1A) in the second computing system 250 can receive the encrypted CHD and the security certificate and transmit the encrypted CHD and the security certificate to the web-services module (e.g. web-services module 126 and 142 as shown in FIGS. 1A-B) in the second computing system 250. The web-services module can authenticate the encrypted CHD by transmitting the security certificate to a certificate authority server (e.g. certificate authority server 112 as shown in FIG. 1A) within the second computing system 250. The certificate authority server can authenticate the security certificate and transmit a confirmation of authentication to the web-services module. The web-services module can then route the encrypted CHD to the decryption module (e.g. decryption module 120 and 164 as shown in FIGS. 1A-B) within the second computing system 250.

The decryption module can be a Hardware Security Module (HSM). The decryption module can decrypt the encrypted CHD. The decryption module can retrieve the public key needed to decrypt the encrypted CHD from a public key server (e.g. public key server 110 or key management module 144 as shown in FIGS. 1A-B). The decryption module may transmit the decrypted CHD to the web-services module. The web-services module can route the decrypted CHD to the tokenization module (e.g. tokenization module 122 and 150 as shown in FIGS. 1A-B). The tokenization module can generate a token representing the decrypted CHD. The tokenization module can store the token and the decrypted CHD in a token vault 245. The tokenization module can transmit the token to the web-service module along with the decrypted CHD. The web-services module can then transmit the decrypted CHD and the token to the authorization module. The authorization module can transmit the decrypted CHD to the authorization services (e.g. authorization services 136 as shown in FIG. 1A). The authorization services 136 can be outside of the second computing system (in which case the decrypted CHD may be re-encrypted for transit) and can be configured to process payment information using the CHD and to transmit a confirmation of payment processing to the authorization module. The authorization module can transmit a receipt of payment (indicating a transaction was successfully processed) along with the token representing the decrypted CHD to the first computing system 200. The first computing system 200 can store the token in a transaction log.

The first computing system 200 can subsequently receive a request to process the same encrypted CHD a subsequent time. For example, a request may be received from a user to conduct a transaction using stored card data. The first computing system 200 can determine that there is a token associated with the encrypted CHD. The first computing system 200 can retrieve the token associated with the encrypted CHD from a transaction log, for example from a transaction log stored in a database in communication with the first computing system, and transmit the token to the second computing system 250 in order to have a transaction authorized. The authorization module can receive the token and transmit the token to the web-services module. The web-services module can retrieve the decrypted CHD associated with the token from the token vault 235 using the token. The web-services module can transmit the decrypted CHD associated to the authorization module. The authorization module can transmit the decrypted CHD to the authorization services. The authorization service can authorize and process the payment information using the CHD and transmit a confirmation of the payment to the authorization module. The authorization module can then transmit a receipt payment with the token to the first computing system 200.

As a non-limiting example, an encrypted CHD can be embodied as: f17mcS9Ct+hosrfN/gz13Jaqy3nsZF5GU01AMAS00NbiiGqT13GLYG/rQZfM6AZqRfw4qRuy dhskHv3KdUgrMi2PyW8QobtdGaP837n5uwKTAZAFuR nMGpATk44pwUdF09RJWHdRpIM EOAqfX0AaqcnUIHZq6ncXHNZakSrhYwDyONV8fwIW dhs8T2KEEi+vYkOck9ipSy34XX/T LzDVhEyHLxfpDgb2er9EmOAsOsmFJgldVRHJA9XtLP Eoyqpx6EWakCB/ZMp6CYV28WbA Dtoavnk6GIroICxb1QTTGwYv7CzEG014hs81KiU3crin7 HCsMEN3oMW7pPEMKa/4w==. An public key to decrypt the encrypted CHD can be embodied as: as:b5acf232rf3. A token generated for the CHD can be embodied as: rZMW2fymN4Huk9gGHCFTi9AQHxX62biXSeframpbe fo=.

Figure 3:
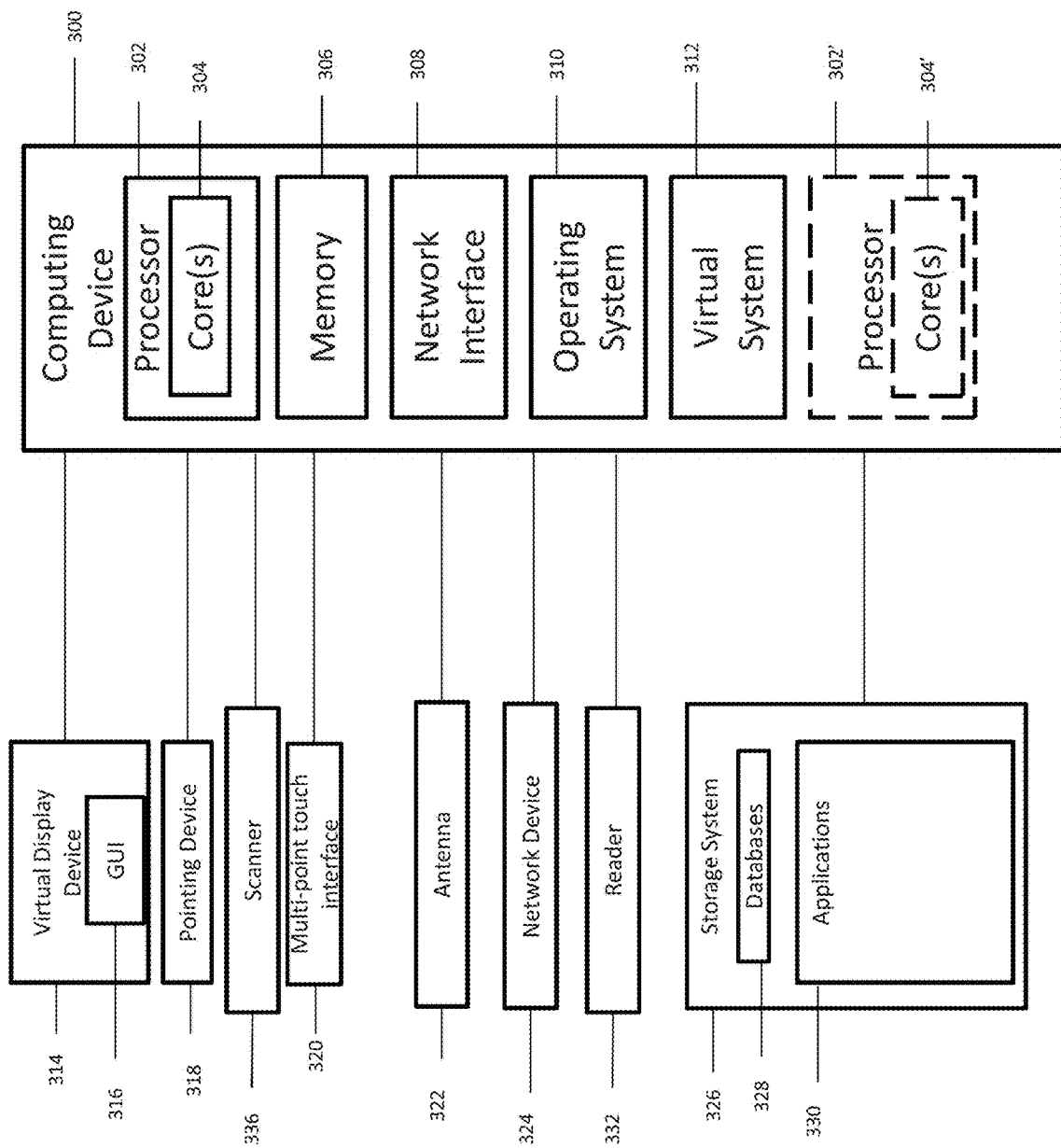
FIG. 3 is a block diagram illustrating an exemplary computing device in accordance with an exemplary embodiment.

FIG. 3 is a block diagram of an example computing device for implementing exemplary embodiments. The computing device 300 can implement embodiments of the first computing system, the second computing system, the PED, and the mobile device. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an scanner 336 and a reader 332. The scanner 336 and reader 332 can be configured to read sensitive data.

The computing device 300 may also include one or more storage devices 326, such as a hard-drive, CD-ROM, or other computer readable media, for storing data and computer-readable instructions and/or software that implement exemplary embodiments (e.g., applications). For example, exemplary storage device 326 can include one or more databases 328 for storing information regarding available physical objects and account holder information. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
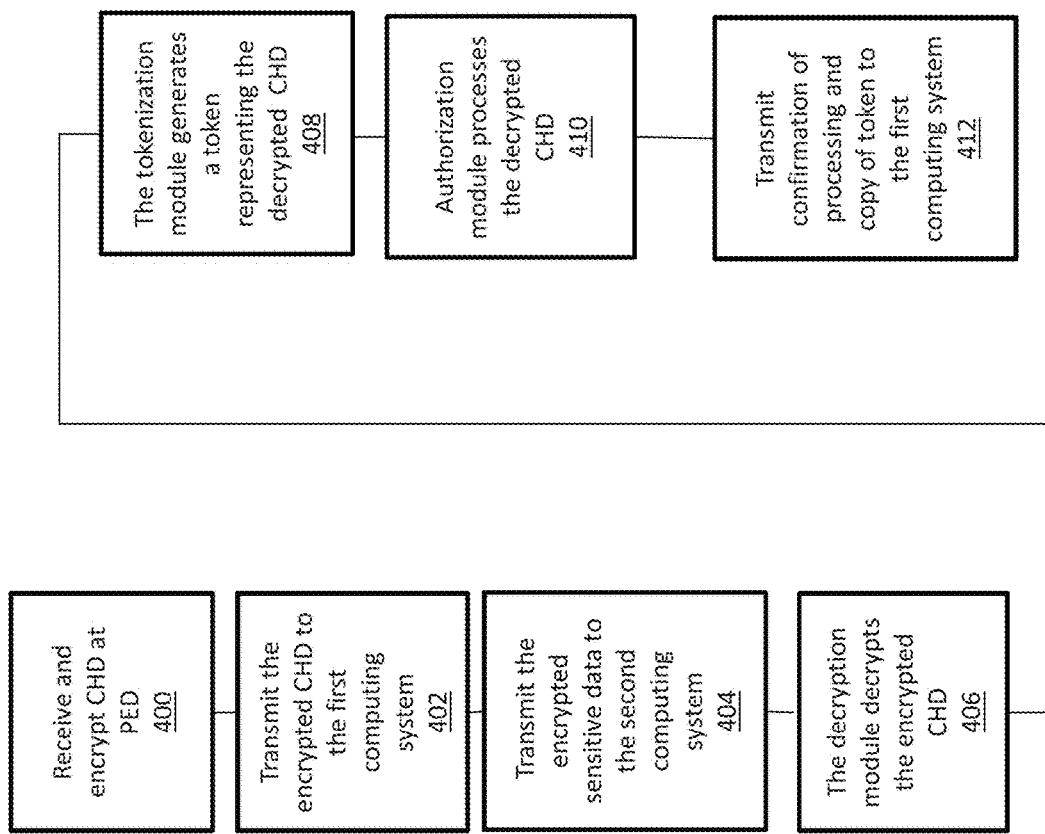
FIG. 4 is a flowchart illustrating an exemplary process performed in a point to point encryption and tokenization system when receiving the encrypted sensitive data for the first time according to an exemplary embodiment.

FIG. 4 is a flowchart illustrating an exemplary process performed in a point to point encryption and tokenization system when receiving encrypted sensitive data for the first time according to an exemplary embodiment. In operation 400, a PED (e.g. PED 134 and 245 as shown in FIGS. 1A and 2) or mobile device (e.g. mobile device 260 as shown in FIG. 2) can receive CHD or other sensitive data for processing. In one embodiment, the PED or mobile device can encrypt the data using asymmetric encryption. In operation 402, the PED or mobile device can transmit the encrypted CHD or other sensitive data to the first computing system (e.g. first computing system 134 and 200 as shown in FIGS. 1A and 2).

In operation 404, the first computing system can transmit the encrypted CHD or other sensitive data to the second computing system (e.g. second computing system 106 and 250 as shown in FIGS. 1A and 2). The first computing system can also send a security certificate along with the encrypted data. In operation 406, the second computing system decrypts the encrypted CHD or other sensitive data following authentication. For example, an authorization module (e.g. authorization module 104 as shown in FIG. 1A) in the second computing system can receive the encrypted CHD or other sensitive data and the security certificate and transmit the encrypted CHD or other sensitive data and the security certificate to the web-services module (e.g. web-services module 126 and 142 as shown in FIGS. 1A-B) within the second computing system. The web-services module can authenticate the encrypted CHD or other sensitive data by transmitting the security certificate to the certificate authority server (e.g. certificate authority server 112 as shown in FIG. 1A) within the second computing system 250. The certificate authority server can authenticate the security certificate and transmit a confirmation of authentication to the web-services module. The web-services module can then route the encrypted sensitive data to the decryption module (e.g. decryption module 120 and 164 as shown in FIGS. 1A-B) within the second computing system for decryption.

The decryption module can be a Hardware Security Module (HSM) configured to decrypt the encrypted CHD or other sensitive data. For example, the decryption module can retrieve a public key to decrypt the encrypted CHD or other sensitive data from the public key server (e.g. public key server 110 or key management module 144 as shown in FIGS. 1A-B). The decryption module then transmit the decrypted CHD or other sensitive data to the web-services module which in turn may route the decrypted CHD or other sensitive data to the tokenization module (e.g. tokenization module 122 and 150 as shown in FIGS. 1A-B). In operation 408, the tokenization module can generate a token representing the decrypted CHD or other sensitive data. The tokenization module can store the token and the decrypted CHD or other sensitive data in a token vault (e.g. token vault 245 as shown in FIG. 2). The tokenization module can then transmit the token to the web-service module along with the decrypted CHD or other sensitive data for routing to an authorization module to perform the requested authorization processing. In operation 410 the authorization module may process the decrypted CHD or other sensitive data according to the request of the first computing system. For example, the authorization module may transmit the decrypted sensitive data to authorization services (e.g. authorization services 136 as shown in FIG. 1A) to determine whether a payment should be authorized form a user's account. In one embodiment, the authorization services can be located outside of the second computing system and the decrypted CHD or other sensitive data may be re-encrypted for transit to the authorization services. For example, the authorization services may be a third party payment processing system. The authorization services may process the CHD or other sensitive data and transmit a confirmation of processing back to the authorization module. In operation 412, the authorization module can transmit a receipt or other confirmation of the processing along with the token representing the decrypted CHD or other sensitive data to the first computing system. The first computing system can store the token for future reference, for example, such as by storing the token in a transaction log or other storage location in a database.

Figure 5:
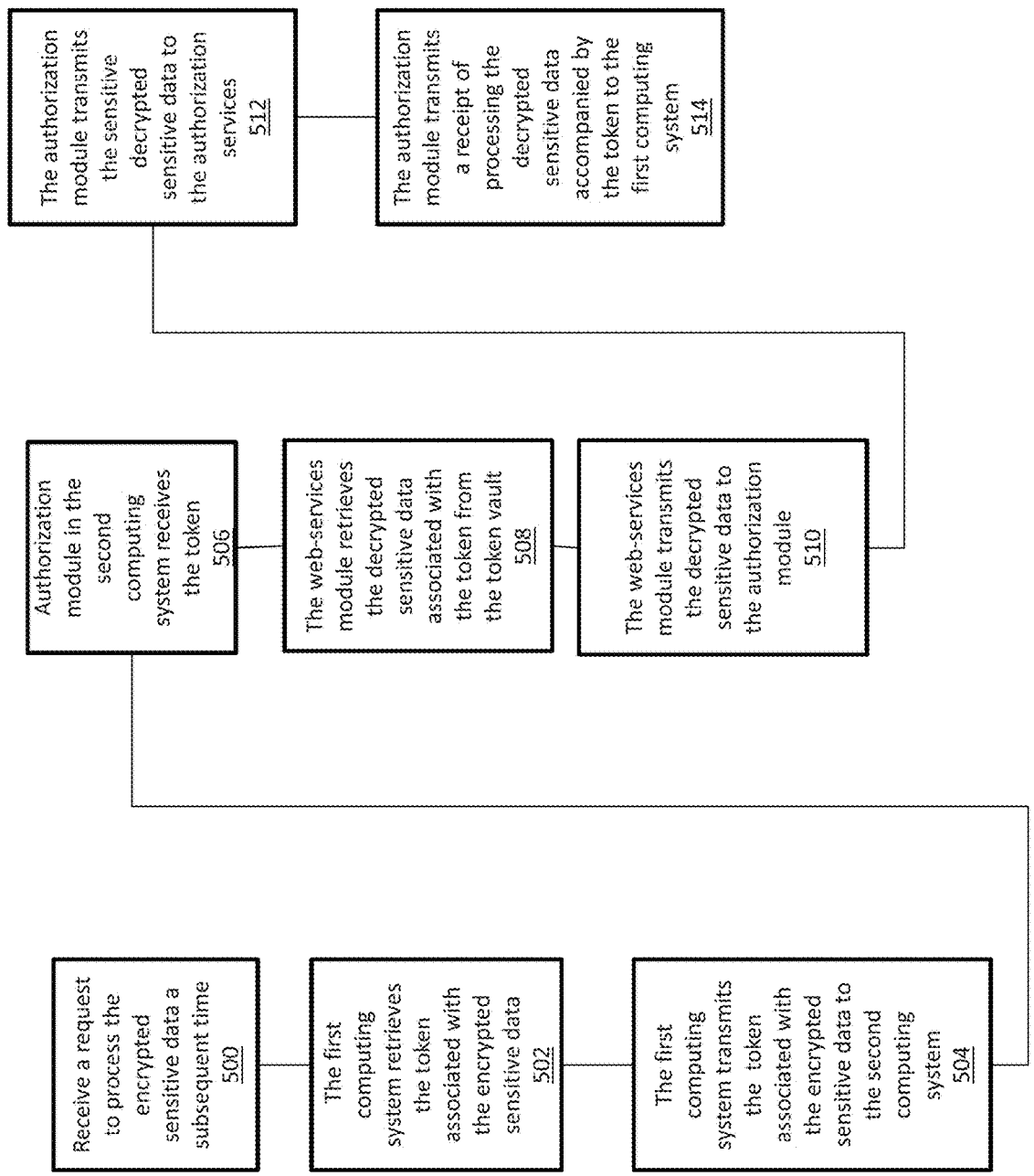
FIG. 5 is a flowchart illustrating an exemplary process performed in a point to point encryption and tokenization system when receiving the encrypted sensitive data a subsequent time according to an exemplary embodiment.

FIG. 5 is a flowchart illustrating an exemplary process performed in a point to point encryption and tokenization system when receiving the encrypted sensitive data a subsequent time according to an exemplary embodiment. In operation 500, the first computing system (e.g. first computing system 134 and 200 as shown in FIGS. 1A and 2) can receive a request to process the encrypted sensitive data a subsequent time. For example, a user may wish to rely on data that has already been provided to the first computing system. The first computing system can determine that there is a token associated with the encrypted sensitive data. In operation 502, the first computing system can retrieve the token associated with the encrypted sensitive data. For example, the token may be retrieved from a transaction log holding information regarding previous transactions. In operation 504, the first computing system can transmit the token associated with the encrypted sensitive data to the second computing system (e.g. second computing system 106 and 250 as shown in FIGS. 1A and 2). In operation 506, the authorization module (e.g. authorization module 104 as shown in FIG. 1A) can receive the token and transmit the token to the web-services module. In operation 508, the web-services module can retrieve the decrypted sensitive data associated with the token from the token vault (e.g. token vault 245 as shown in FIG. 2) using the token.

In operation 510, the web-services module can transmit the decrypted sensitive data associated to the authorization module. In operation 512, the authorization module can transmit the sensitive decrypted sensitive data to the authorization module (e.g. authorization services 136 as shown in FIG. 1A). The authorization services can process and authorize the decrypted sensitive data and transmit a confirmation to the authorization module. In operation 514, the authorization module can transmit a receipt of processing the decrypted sensitive data accompanied by the token to the first computing system.

Figure 6:
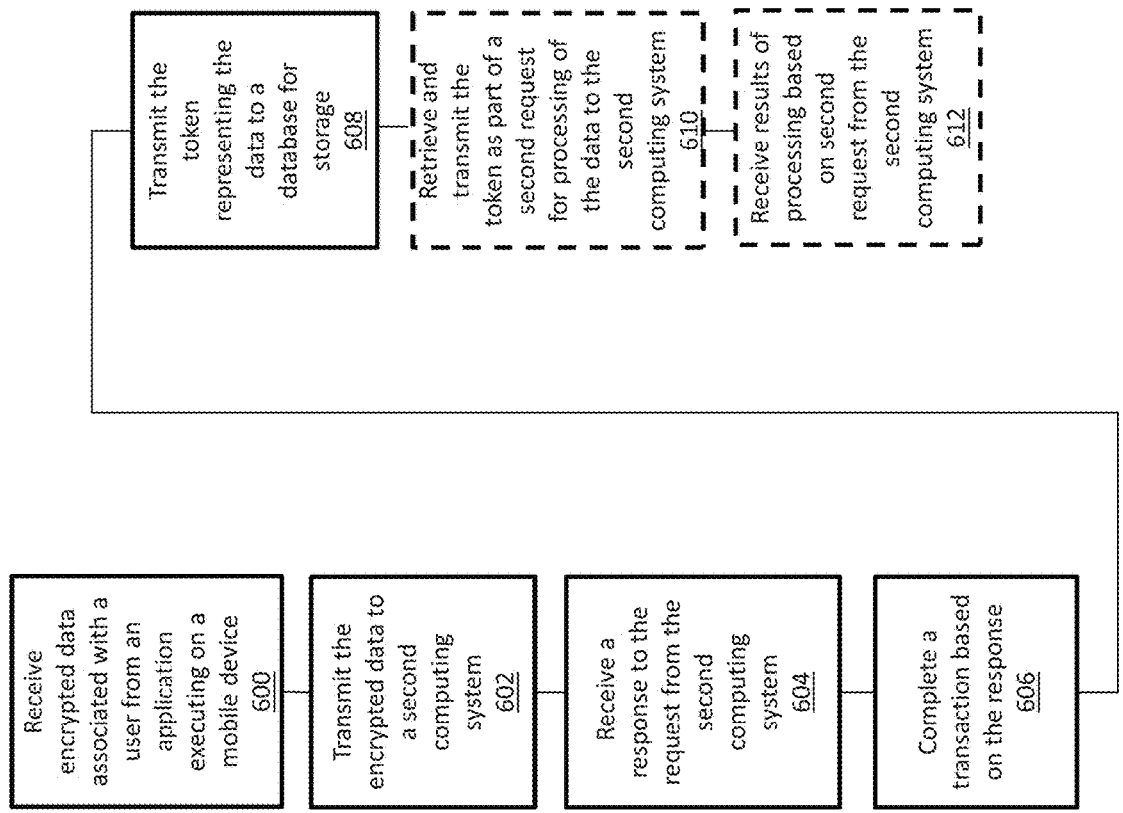
FIG. 6 is a flowchart illustrating an exemplary process performed in a point to point encryption and tokenization system when a mobile device is in communication with the first computing system time according to an exemplary embodiment.

As discussed above, in one embodiment, instead of a user's sensitive data being encrypted by a PED, the data may instead be encrypted by a user's mobile device executing an application in communication with the first computing system. FIG. 6 is a flowchart illustrating an exemplary process performed in a point to point encryption and tokenization system when a mobile device is in communication with the first computing system according to an exemplary embodiment. In operation 600, the first computing system (e.g. first computing system 134 and 200 as shown in FIGS. 1A and 2) receives encrypted data associated with a user from an application executing on a mobile device. In some embodiments, a communication pathway can be automatically established between the mobile device and the first computing system in response to executing the application on the mobile device. For example, the encrypted data can be received by the first computing system using a proximity-based wireless communication protocol such as Blueooth™ and/or Near Field Communication. The data can be encrypted using asymmetric encryption and a public/private key pair. The encrypted data can be sensitive data such as CHD. The CHD can be credit or charge card account information associated with a user. In operation 602, the first computing system can transmit the encrypted data from the first computing system to a second computing system (e.g. second computing system 106 and 250 as shown in FIGS. 1A and 2) hosting a Payment Card Industry Data Security Standard (PCI DSS)-compliant environment as part of a request to process the encrypted data. The PCI DSS is a proprietary information security standard for organizations that handle financial credit cards. A PCI DSS environment aims to ensure sensitive data such as CHD is handled securely. In operation 604, the first computing system can receive a response to the request from the second computing system, indicating that the processing has occurred, the response may be accompanied by a token representing the data. For example, the response may indicate that a proposed transaction has been authorized or declined based on a user's availability of funds as inspected using the CHD. In operation 606, the first computing system can complete a transaction based on the response. For example, the first computing system may complete a sale. In operation 608, the first computing system can transmit the token representing the data to a database for storage instead of storing the originally received encrypted data. For example, the first computing system may store the token in a transaction log. In one embodiment, the first computing system may query the mobile device user for permission to store the user's data before storing the token.

The stored token may be subsequently used by the first computing system in a later occurring transaction. For example, in one embodiment, a user interacting with the first computing system through the application executing on their mobile phone may express a desire to complete a second transaction using the data previously provided by the application to the first computing system (i.e. the previously provided encrypted data). The first computing system may retrieve the stored token from the transaction log or other location and forward the token as part of a second request to the second computing system (operation 610). The token may be used by the second computing system to retrieve the earlier-provided and stored CHD and, following processing by the authentication module, a response to the processing of the second request may be received by the first computing system from the second computing system (operation 612).

As discussed above, in one embodiment, the point to point encryption and tokenization system is hosted on a machine PCI environment implementing a data security standard. FIG. 7 is a flowchart illustrating an exemplary process performed in point to point encryption and tokenization in a hosted machine payment card industry (PCI) environment implementing a data security standard according to an exemplary embodiment. In operation 700, the hosted machine PCI environment can receive encrypted card holder data (CHD) from an external system with a computing system operatively coupled to a database in the hosted machine PCI environment. For example, the external system can be the first computing system (e.g. first computing system 134 and 200 as shown in FIGS. 1A and 2) and the computing system in the hosted machine PCI environment can be the second computing system (e.g. second computing system 106 and 250 as shown in FIGS. 1A and 2). The external system can receive the external data from a (e.g. PED 134 and 245 as shown in FIGS. 1A and 2) or mobile device (e.g. mobile device 260 as shown in FIG. 2). The computing system in the hosted machine PCI environment can include processing zones. Each processing zone can hold one or more processing modules. The processing modules can include a decryption module (e.g. decryption module 120 and 164 as shown in FIGS. 1A-B), a tokenization module (e.g. tokenization module 122 and 150 as shown in FIGS. 1A-B) and an authorization module (e.g. authorization module 104 as shown in FIG. 1A). The data transfers between the processing zones can be monitored and restricted according to pre-defined policies using a number of different security techniques as discussed above. The processing modules can further include a web services module (e.g. web-services module 126 and 142 as shown in FIGS. 1A-B) implemented as middleware in the computing system in the hosted machine PCI environment. The web services module can use a representational state transfer (REST) architecture. The computing system can include a certificate authority server (e.g. certificate authority server 112 as shown in FIG. 1A) which can host a key management system (e.g. public key server 110 or key management module 144 as shown in FIGS. 1A-B) configured to issue public keys and store security certificates.

In operation 702, the decryption module can decrypt the encrypted CHD. The decryption module can be a Hardware Security Module (HSM). In operation 704, the tokenization module can generate a token representing the decrypted CHD. In operation 706, the authorization module can process the decrypted CHD based on the request from the external computing system. In operation 708, a confirmation of the processing can be transmitted to the external computing system. For example, the confirmation may indicate that a proposed transaction has been authorized or declined based on a user's availability of funds as inspected via the authorization module using the CHD. In operation 710, the computing system in the PCI environment can store the token representing the decrypted CHD and the decrypted CHD in the database, such as a token vault (e.g. token vault 245 as shown in FIG. 2).

The stored token may be subsequently used by the external computing system in a later occurring transaction. For example, in one embodiment, a user interacting with the external computing system may wish to perform a second transaction using the data previously provided by the application to the external computing system (i.e. the previously provided encrypted data). The external computing system may retrieve and forward the token as part of a second request to the computing system in the hosted machine PCI environment. The token may be used by the computing system in the PCI environment to retrieve the earlier-provided CHD from the database and the authentication module can process the transaction using the CHD (operation 712). In operation 714, the a response to the processing of the second request within the PCI environment may be received by the external computing system.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A point to point encryption and tokenization system using a mobile device, the system comprising:
a first computing system external to a Payment Card Industry (PCI) zone in communication with a mobile device and modules of a second computing system connected in the PCI zone configured to process data in compliance with a PCI Data Security Standard (DSS) in a secured environment; and
a database in communication with the first computing system,
wherein the first computing system includes a computer readable storage memory storing computer executable codes which, when executed by the first computing system is configured to cause the first computing system to:
receive encrypted data associated with a user from the mobile device;
transmit_the encrypted data to the second computing system as part of a request to process the encrypted data in the PCI zone;
receive a response from the second computing system indicating that the processing has occurred accompanied by a token representing the data;
complete a transaction based on the response;
query the mobile device for permission to store the token representing the data associated with the user;
store the token representing the data in the database;
receive a user request from the mobile device for a second transaction using the data associated with the user;
retrieve the stored token from the database in response to the received user request; and
transmit the stored token and a new request for further processing of the data in the PCI zone to the second computing system.

2. The system of claim 1, wherein the first computing system is further configured to:
receive the encrypted data using a proximity-based wireless communication protocol.

3. The system of claim 2, wherein the proximity-based wireless communication protocol is one of BLUETOOTH™ and Near Field Communication.

4. The system of claim 1 wherein the data associated with the user is card holder data associated with a credit card or charge card of the user.

5. The system of claim 1, wherein the first computing system is further configured to:
receive an authorization from the second computing system and in response store a token representing the data in a transaction log.

6. The system of claim 1, wherein the first computing system and the second computing system are located in different geographic locations.

7. The system of claim 1, wherein the encrypted data is asymmetrically encrypted.

8. The system of claim 1, wherein the first computing system is further configured to:
receive a response to the new request regarding the further processing from the second computing system.

9. The system of claim 1, wherein the first computing system is further configured to:
receive an authorization from the second computing system in response to the new request and to store a token representing the data in a transaction log.

10. A point to point encryption and tokenization method using a mobile device, the method comprising:
receiving at a first computing system external to a Payment Card Industry (PCI) zone, from an application executing on a mobile device associated with a user, encrypted data associated with the user;
transmitting the encrypted data from the first computing system to modules of a second computing system connected in the PCI zone configured to process data in compliance with a PCI Data Security Standard (DSS) in a secured environment as part of a request to process the encrypted data in the PCI zone;
receiving at the first computing system a response to the request from the second computing system indicating that the processing has occurred, the response accompanied by a token representing the data;
completing, via the first computing system, a transaction based on the response;
querying the mobile device for permission to store the token representing the data;
transmitting the token representing the data from the first computing system to a database for storage;
receive a user request from the mobile device for a second transaction using the data associated with the user;
retrieving the stored token from the database in response to the user request; and
transmitting the stored token and a new request for further processing of the data in the PCI zone to the second computing system, wherein the second computing system uses the token representing the data to retrieve the data and perform the further processing.

11. The method of claim 10, further comprising:

establishing automatically with the mobile device a communication pathway between the mobile device and the first computing system in response to the mobile device beginning execution of the application.

12. The method of claim 10, further comprising:

receiving with the first computing system the encrypted data using a proximity-based wireless communication protocol.

13. The method of claim 12, wherein the proximity-based wireless communication protocol is one of Bluetooth™ and Near Field Communication.

14. The method of claim 10, wherein the data associated with the user is card holder data associated with a credit card or charge card of the user.

15. The method of claim 10, further comprising:

receiving with the first computing system an authorization from the second computing system and in response storing a token representing the data in a transaction log.

16. The method of claim 10, wherein the first computing system and the second computing system are located in different geographic locations.

17. The method of claim 10, wherein the data encrypted by the mobile device is encrypted using asymmetric encryption.

18. The method of claim 10, further comprising:

receiving at the first computing system a response to the new request regarding the further processing from the second computing system.

19. The method of claim 10, further comprising:

receiving at the first computing system an authorization from the second computing system and in response storing a token representing the data in a transaction log.

* * * * *

UNITED STATES PATENT AND TRADEMARK OFFICE
CERTIFICATE OF CORRECTION

| | | |
|---|---|---|
| PATENT NO. | : 11,361,312 B2 | Page 1 of 1 |
| APPLICATION NO. | : 15/710250 | |
| DATED | : June 14, 2022 | |
| INVENTOR(S) | : Aaron Marcus Johnson | |

It is certified that error appears in the above-identified patent and that said Letters Patent is hereby corrected as shown below:

In the Claims

In Claim 1, Column 13, Line 58, delete "transmit_the" and insert -- transmit the --.

Signed and Sealed this
Fifteenth Day of November, 2022

Katherine Kelly Vidal
*Director of the United States Patent and Trademark Office*